(12) United States Patent
Narita

(10) Patent No.: US 10,311,032 B2
(45) Date of Patent: Jun. 4, 2019

(54) RECORDING MEDIUM, LOG MANAGEMENT METHOD, AND LOG MANAGEMENT APPARATUS

(71) Applicant: FUJITSU LIMITED, Kawasaki-shi, Kanagawa (JP)

(72) Inventor: Kenichi Narita, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 544 days.

(21) Appl. No.: 15/211,000

(22) Filed: Jul. 15, 2016

(65) Prior Publication Data

US 2017/0060914 A1    Mar. 2, 2017

(30) Foreign Application Priority Data

Aug. 31, 2015  (JP) .................................. 2015-171283

(51) Int. Cl.
*G06F 16/00* (2019.01)
*G06F 16/215* (2019.01)
*G06F 17/40* (2006.01)
*G06F 11/30* (2006.01)
*G06F 11/34* (2006.01)

(52) U.S. Cl.
CPC ............ *G06F 16/215* (2019.01); *G06F 17/40* (2013.01); *G06F 11/3093* (2013.01); *G06F 11/3409* (2013.01)

(58) Field of Classification Search
None
See application file for complete search history.

(56) References Cited

U.S. PATENT DOCUMENTS

| 2006/0026182 | A1* | 2/2006 | Takeda .................. H04N 7/165 |
| 2012/0179646 | A1 | 7/2012 | Hinton et al. |
| 2014/0149466 | A1 | 5/2014 | Sato et al. |

FOREIGN PATENT DOCUMENTS

| JP | 2010-128901 | 6/2010 |
| JP | 2014-502767 | 2/2014 |
| JP | 2014-106655 | 6/2014 |
| WO | 2012/094760 | 7/2012 |

* cited by examiner

*Primary Examiner* — Belix M Ortiz Ditren
(74) *Attorney, Agent, or Firm* — Fujitsu Patent Center

(57) ABSTRACT

A non-transitory computer-readable recoding medium having stored therein a log management program that causes a computer to execute a process that includes suspending, in accordance with a change in information related to an operation of a device under management, deletion of log items of log data of the device performed in accordance with log pattern identification information generated according to a regularity of the log items of the log data, determining, according to a change situation of the information related to the operation, suitability of the deletion of the log items performed in accordance with the log pattern identification information, and updating, when the deletion is determined to be unsuitable, the log pattern identification information according to a log item stored after the deletion has been suspended.

7 Claims, 14 Drawing Sheets

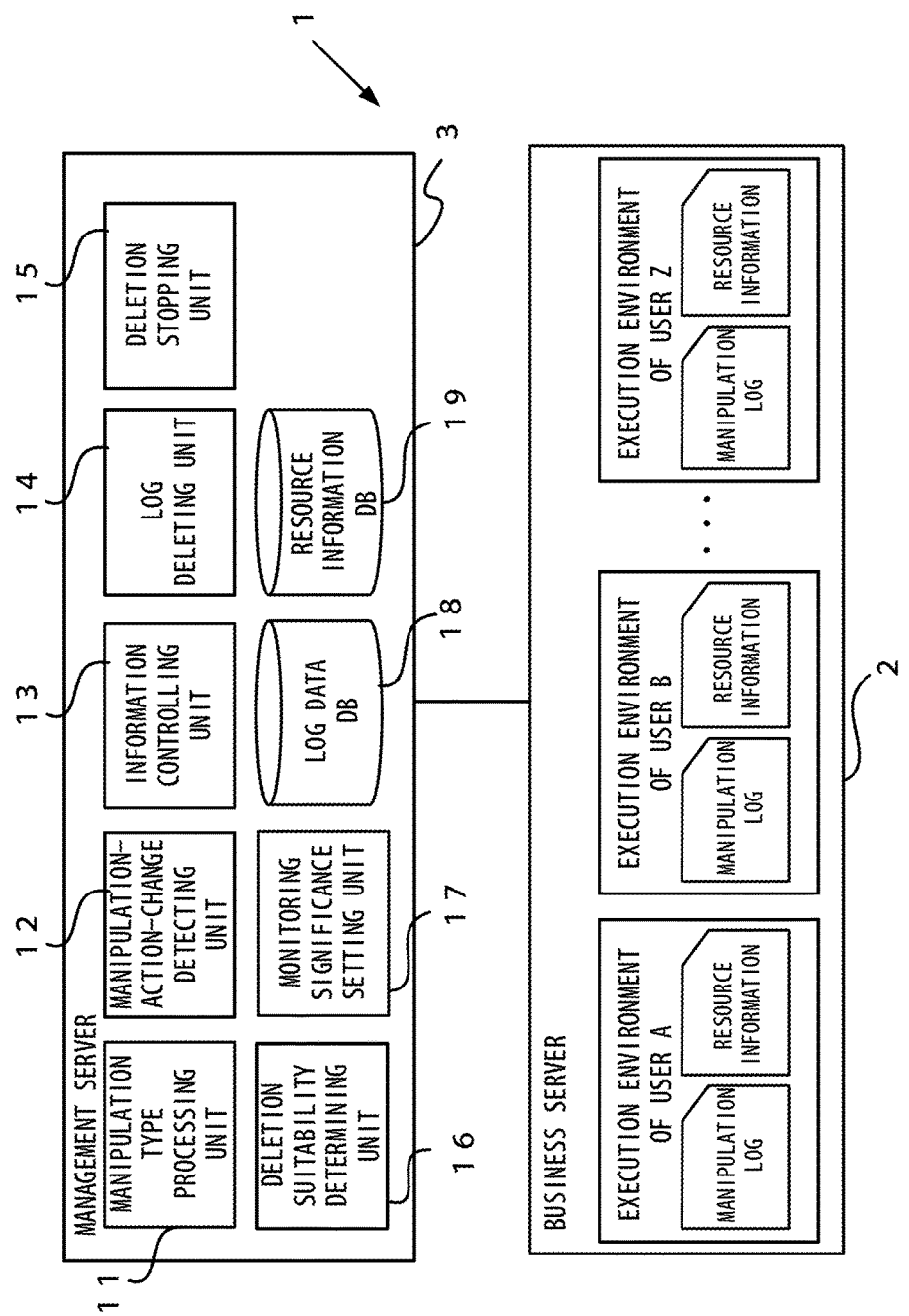
F I G. 1

| MONTH | WEEK | WAVEFORM | MANIPULATION TYPE | OPERATION |
|---|---|---|---|---|
| 1 | 1 | W1 | — | START MANIPULATION ACTIONS ON SYSTEM |
| 1 | 2 | W1 | — | |
| 1 | 3 | W1 | — | |
| 1 | 4 | W1 | — | |
| 2 | 1 | W1 | T1 | GENERATE INITIAL MANIPULATION TYPE |
| 2 | 2 | W1 | T1 | |
| 2 | 3 | W1 | T1 | |
| 2 | 4 | W1 | T1 | |
| ⋮ | ⋮ | ⋮ | ⋮ | |
| 3 | 4 | W1 | T1 | |
| 4 | 1 | W1 | T1 | |
| 4 | 2 | W1 | T1 | |
| 4 | 3 | W1 | T1 | |
| 4 | 4 | W2 | T1 | SUSPEND DELETION OF LOG ITEMS |
| 5 | 1 | W2 | T1 | |
| 5 | 2 | W2 | T1 | |
| 5 | 3 | W2 | T2 | GENERATE NEW MANIPULATION TYPE |
| ⋮ | ⋮ | ⋮ | ⋮ | |

| MONTH | WEEK | WAVEFORM | MANIPULATION TYPE | OPERATION |
|---|---|---|---|---|
| 1 | 1 | W1 | — | START MANIPULATION ACTIONS ON SYSTEM |
| 1 | 2 | W1 | — | |
| 1 | 3 | W1 | — | |
| 1 | 4 | W1 | T1 | |
| 2 | 1 | W1 | T1 | GENERATE MANIPULATION TYPE |
| 2 | 2 | W1 | T1 | |
| 2 | 3 | W1 | T1 | |
| 2 | 4 | W1 | T1 | |
| ⋮ | ⋮ | ⋮ | ⋮ | |
| 3 | 4 | W1 | T1 | |
| 4 | 1 | W1 | T1 | |
| 4 | 2 | W1 | T1 | |
| 4 | 3 | W2 | T1 | SUSPEND DELETION OF LOG ITEMS |
| 4 | 4 | W1 | T1 | USE PREVIOUS MANIPULATION TYPE |
| 5 | 1 | W1 | T1 | |
| 5 | 2 | W1 | T1 | |
| 5 | 3 | W1 | T1 | |
| ⋮ | ⋮ | ⋮ | ⋮ | |

MANIPULATION-ACTION-CHANGE MANAGEMENT INFORMATION

| 00001, 1 |
| 00002, 2 |
| ... |

FIRST COLUMN : USER ID

SECOND COLUMN :
0 : OPERATIONS HAVE BEEN STOPPED
1 : MANIPULATION-ACTION-CHANGE LIKELIHOOD HAS NOT BEEN DETECTED
2 : MANIPULATION-ACTION-CHANGE LIKELIHOOD HAS BEEN OUTPUT, AND NEITHER MANIPULATION-ACTION-CHANGE OCCURRENCE REPORT NOR MANIPULATION-ACTION-CHANGE CANCELLATION REPORT HAS BEEN OUTPUT
3 : MANIPULATION-ACTION-CHANGE OCCURRENCE REPORT HAS BEEN OUTPUT
4 : MANIPULATION-ACTION-CHANGE CANCELLATION REPORT HAS BEEN OUTPUT

LOG DELETION MANAGEMENT INFORMATION

| 00001, 1 |
| 00002, 2 |
| ... |

FIRST COLUMN : USER ID

SECOND COLUMN : LOG DELETION STATE
0 : OPERATIONS HAVE BEEN STOPPED
1 : MANIPULATION-ACTION-CHANGE LIKELIHOOD HAS NOT BEEN INPUT
2 : MANIPULATION-ACTION-CHANGE LIKELIHOOD REPORT HAS BEEN INPUT
3 : MANIPULATION-ACTION-CHANGE OCCURRENCE REPORT HAS BEEN INPUT
4 : MANIPULATION-ACTION-CHANGE CANCELLATION REPORT HAS BEEN INPUT

F I G. 1 0

RECORDING MEDIUM, LOG MANAGEMENT METHOD, AND LOG MANAGEMENT APPARATUS

CROSS-REFERENCE TO RELATED APPLICATION

This application is based upon and claims the benefit of priority of the prior Japanese Patent Application No. 2015-171283, filed on Aug. 31, 2015, the entire contents of which are incorporated herein by reference.

FIELD

The embodiments discussed herein are related to a recording medium, a log management method, and a log management apparatus.

BACKGROUND

Recently, services have been used such that devices such as business servers of service users are disposed in a data center and such that management servers of the data center manage the devices. In such services, the management servers store log data of devices under management.

Patent document 1: Japanese Laid-open Patent Publication No. 2010-128901
Patent document 2: Japanese Laid-open Patent Publication No. 2014-106655
Patent document 3: Japanese National Publication of International Patent Application No. 2014-502767
Patent document 4: U.S. Patent Publication No. 2012/0179646
Patent document 5 U.S. Patent Publication No. 2014/0149466

SUMMARY

According to an aspect of the embodiments, a non-transitory computer-readable recoding medium having stored therein a log management program that causes a computer to execute a process that includes suspending, in accordance with a change in information related to an operation of a device under management, deletion of log items of log data of the device performed in accordance with log pattern identification information generated according to a regularity of the log items of the log data, determining, according to a change situation of the information related to the operation, suitability of the deletion of the log items performed in accordance with the log pattern identification information, and updating, when the deletion is determined to be unsuitable, the log pattern identification information according to a log item stored after the deletion has been suspended.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary management server and an exemplary business server;

FIG. 6 illustrates an exemplary correlation between a waveform, a manipulation type, and an operation of a management server (example 1);
FIG. 8 illustrates an exemplary correlation between a waveform, a manipulation type, and an operation of a management server (example 2);
FIG. 10 illustrates an example of manipulation-action-change management information and an example of log deletion management information.

DESCRIPTION OF EMBODIMENTS

Figure 2:
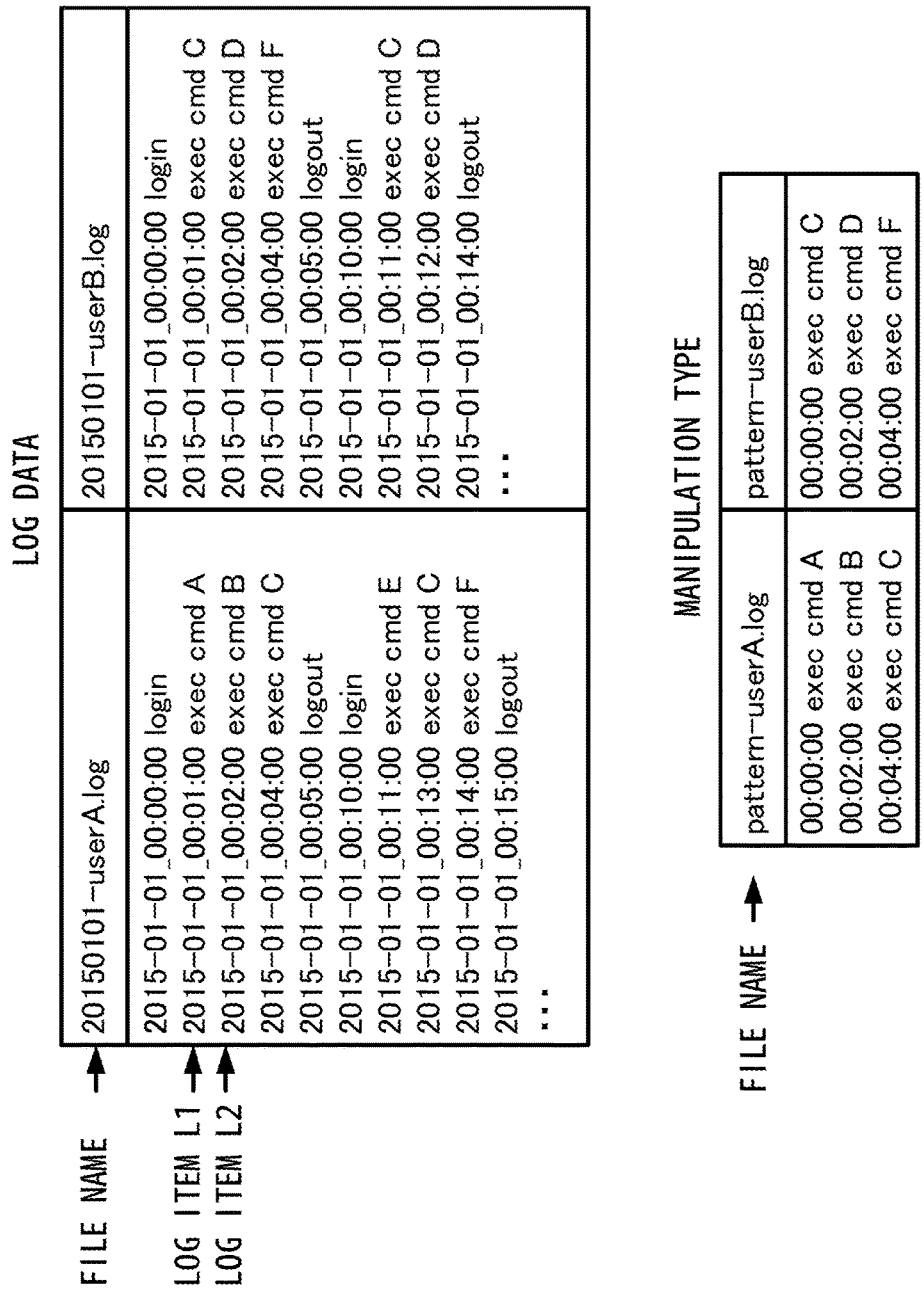
FIG. 2 illustrates an example of log data and an exemplary manipulation type.

The sum of the sizes of logs a management server can store is limited. Hence, deleting logs periodically is requested according to their content, and maintaining logs for post analysis requested without being deleted.

When the management server has recognized, for example, a procedure for manipulation actions (also referred to as an system operation) on a device of a service user, information on some of the logs stored in the management server can be successfully deleted according to the procedure for manipulation actions.

However, for management of manipulation actions in services of recent years such as Platform as a Service (PaaS), it is difficult to obtain a procedure for manipulation actions of a service user. In regard to this, information of logs (information included in the logs) may be periodically deleted according to, for example, a regularity of the logs that is related to a manipulation performed by the service user.

Changing the procedure for manipulation actions changes the operation situation of the device. This also changes a regularity in deleting information of logs. When information is deleted, according to the regularity before a change in the procedure for manipulation actions, from logs after the change in the procedure for manipulation actions, information of logs for use in, for example, an analysis may be deleted.

<Exemplary Business System in Accordance with the Embodiment>

The following will describe the embodiment with reference to the drawings. FIG. 1 illustrates an example of a management system 1 in accordance with the embodiment. In the management system 1 in the example of FIG. 1, a business server 2 is managed by a management server 3.

The business server 2 is disposed in, for example, a data center and managed by the management server 3. The business server 2 is an exemplary device under management. In the embodiment, the business server 2 includes an execution environment (e.g., virtual environment) used by a plurality of users. In the example of FIG. 1, the business server 2 includes an execution environment for each of users A-Z.

The execution environment for each of users A-Z may be achieved by a program operated on the business server 2. A physical device may be allocated to each of users A-Z. The number of execution environments of the business server 2 may be one.

Users A-Z each log in their allocated execution environment and then perform predetermined manipulations on the execution environment. The business server 2 accepts the manipulations and stores a manipulation history as a manipulation log for each execution environment. The manipulation log may be referred to as a system log.

In the embodiment, information related to one manipulation is referred to as a log item. When a plurality of manipulations are performed, a manipulation log includes a plurality of log items. The manipulations accepted by the business server 2 include, for example, manipulations of login and logout.

The manipulations accepted by the business server 2 include a command to cause the business server 2 to perform a predetermined function. Information related to one manipulation is a log item. Hence, when the business server 2 accepts a login manipulation and then receives a logout manipulation after a series of command manipulations are performed, the manipulation log includes a plurality of log items.

The business server 2 stores resource information indicating a status of use of a resource of the business server 2 that is used by each execution environment. The resources include, for example, a hardware resource of the business server 2. Resource information may include information related to a network load caused by the business server 2. Resource information is an example of information related to an operation of a device.

The management server 3 includes a manipulation type processing unit 11, a manipulation-action-change detecting unit 12, an information collecting unit 13, a log deleting unit 14, a deletion stopping unit 15, a deletion suitability determining unit 16, a monitoring significance setting unit 17, a log data database 18, and a resource information database 19. In FIG. 2, "DB" indicates a database. The management server 3 is an example of a log management apparatus.

The manipulation type processing unit 11 performs, for example, a generating process and an updating process for a manipulation type of deleting a log item of log data stored in the log data database 18. A manipulation type is an example of log pattern identification information. The manipulation type processing unit 11 is an example of an updating unit.

For each execution environment of the business server 2, the manipulation-action-change detecting unit 12 detects whether a change has been made to manipulation actions on the system performed by the business server 2. According to a change situation of resource information of each execution environment of the business server 2, the manipulation-action-change detecting unit 12 detects whether a change has been made to the manipulation actions.

The information collecting unit 13 periodically collects manipulation logs and resource information stored by each execution environment of the business server 2. The information collecting unit 13 stores the collected manipulation logs in the log data database 18. Using a manipulation type, the log deleting unit 14 deletes a log item of log data stored in the log data database 18.

The deletion stopping unit 15 suspends deletion of log items performed by the log deleting unit 14. According to a change in the resource information, the deletion suitability determining unit 16 determines suitability of deletion of log items performed using a manipulation type generated by the manipulation type processing unit 11. The deletion suitability determining unit 16 is an example of a determining unit.

The monitoring significance setting unit 17 sets a significance of monitoring for each execution environment. For example, the monitoring significance setting unit 17 may set a high monitoring significance for an execution environment with a high frequency of occurrence of trouble. The monitoring significance setting unit 17 may set a low monitoring significance for an execution environment with a low frequency of occurrence of trouble.

For example, for an execution environment with a high monitoring significance, the management server 3 may increase the number of times monitoring polling to be performed and the number of items to be monitored. For an execution environment with a low monitoring significance, the management server 3 may decrease the number of times monitoring polling to be performed and the number of items to be monitored.

The log data database 18 stores manipulation logs for each execution environment of the business server 2. The resource information database 19 stores resource information for each execution environment of the business server 2.

The following will describe an example of log data and an example of a manipulation type with reference to FIG. 2. The "FILE NAME" in the log data in the example of FIG. 2 indicates a file name in a situation in which the log data is stored in the log data database 18 in a file format.

For example, "20150101-userA.log" is a file for log data related to a manipulation log of a manipulation performed in the execution environment for user A on "Jan. 1, 2015". In the embodiment, the log data database 18 stores log data in a file format for each execution environment. Log data may be stored in a non-file format.

Log data includes the log items for a plurality of manipulation logs. Each single item in the example of FIG. 2 is a log item.

In the example of FIG. 2, "2015-01-01_00:01:00 exec cmd A", which is indicated by log item L1, is one log item. "2015-01-01_00:02:00 exec cmd B", which is indicated by log item L2, is also one log item. The other items are also log items. The log data in the example of FIG. 2 includes a plurality of log items.

In the example of FIG. 2, each log item includes a date, a time, and manipulation information. "login" means that a user has logged in an execution environment of the business server 2. "logout" means that a user has logged out of an execution environment of the business server 2. "exec cmd A" means that an execution environment of the business server 2 has accepted an execution manipulation of a command A.

"FILE NAME" in the manipulation type indicates a file name in a situation in which the manipulation type is stored in the log data database 18 in a file format. For example, "pattern-userA.log" may be the file name of a file for a manipulation type based on details of a manipulation performed in the execution environment for user A.

In the embodiment, the log data database 18 stores a manipulation type for each execution environment in a file format. However, a manipulation type may be stored in a non-file format. A time indicated along with each command represents a time that has elapsed since execution of the initial command of the manipulation type.

Every time the information collecting unit 13 collects manipulation logs from the business server 2, log items are accumulated in the log data database 18. Every time the manipulation type processing unit 11 generates a new manipulation type, the manipulation type of the log data database 18 is updated.

<Example of Generation of Operation Type>

The information collecting unit 13 periodically collects manipulation logs related to manipulations performed on the business server 2, and stores the collected manipulation logs in the log data database 18 as log data. An increase in the information amount of log data stored in the log data database 18 leads to a high usage rate of the resource of the management server 3.

When, for example, the management server 3 performs an analysis based on a manipulation log, an increase in the information amount of log data leads to, for example, a high load on a Central Processing Unit (CPU). This increases the usage rate of the hardware resource of the management server 3.

A procedure for manipulation actions on the system of a service user performed by the business server 2 includes periodic maintenance. The periodic maintenance is performed for each execution environment of the business server 2. Manipulations in the periodic maintenance have a regularity.

For example, the periodic maintenance may be performed by executing a pattern of preset commands in a predetermined time period. Accordingly, the pattern of log items (this may hereinafter be referred to as a log pattern) related to the periodic maintenance also emerges with a predetermined regularity in the log data database 18.

Hence, using a manipulation type based on the log pattern of the periodic maintenance, the log deleting unit 14 deletes, from the log items stored in the log data database 18, a log item that matches the log pattern of the manipulation type. This decreases the usage rate of the hardware resource of the management server 3.

When a certain trouble occurs in an execution environment of the business server 2, a cause of the trouble is investigated. Troubles in the business server 2 accidentally occur, and do not arise with a predetermined regularity, unlike the periodic maintenance.

Accordingly, even when the log deleting unit 14 deletes log items from the log data database 18 using a manipulation type, log items related to the investigation of a cause of a trouble are not deleted from the log data database 18. Even when log items are deleted from the log data database 18 using the manipulation type, a cause of a trouble can be investigated afterward according to log data from the log data database 18.

When the management server 3 has recognized a procedure for manipulation actions on the system performed by the business server 2, the management server 3 recognizes, for example, a time period for the periodic maintenance and a command to be executed, according to the procedure for manipulation actions. As a result, the manipulation type processing unit 11 can generate an appropriate manipulation type, and the log deleting unit 14 can delete log items from the log data database 18 using the appropriate manipulation type.

However, in a service of recent years such as Paas, in some cases, a procedure for manipulation actions on the business server 2 used by a service user is not provided to a service provider. In this case, the management server 3 does not recognize the procedure for manipulation actions on the business server 2. Hence, it is difficult for the manipulation type processing unit 11 to generate an appropriate manipulation type.

The log data database 18 stores manipulation logs collected from the business server 2 by the information collecting unit 13. Hence, the manipulation type processing unit 11 may generate a manipulation type according to a regularity of log items stored in the log data database 18.

In this case, when the manipulation type processing unit 11 refers to the log data database 18 and recognizes that commands with a specific pattern have been executed in a predetermined time period, the manipulation type processing unit 11 generates the recognized command pattern as a manipulation type.

Figure 3:
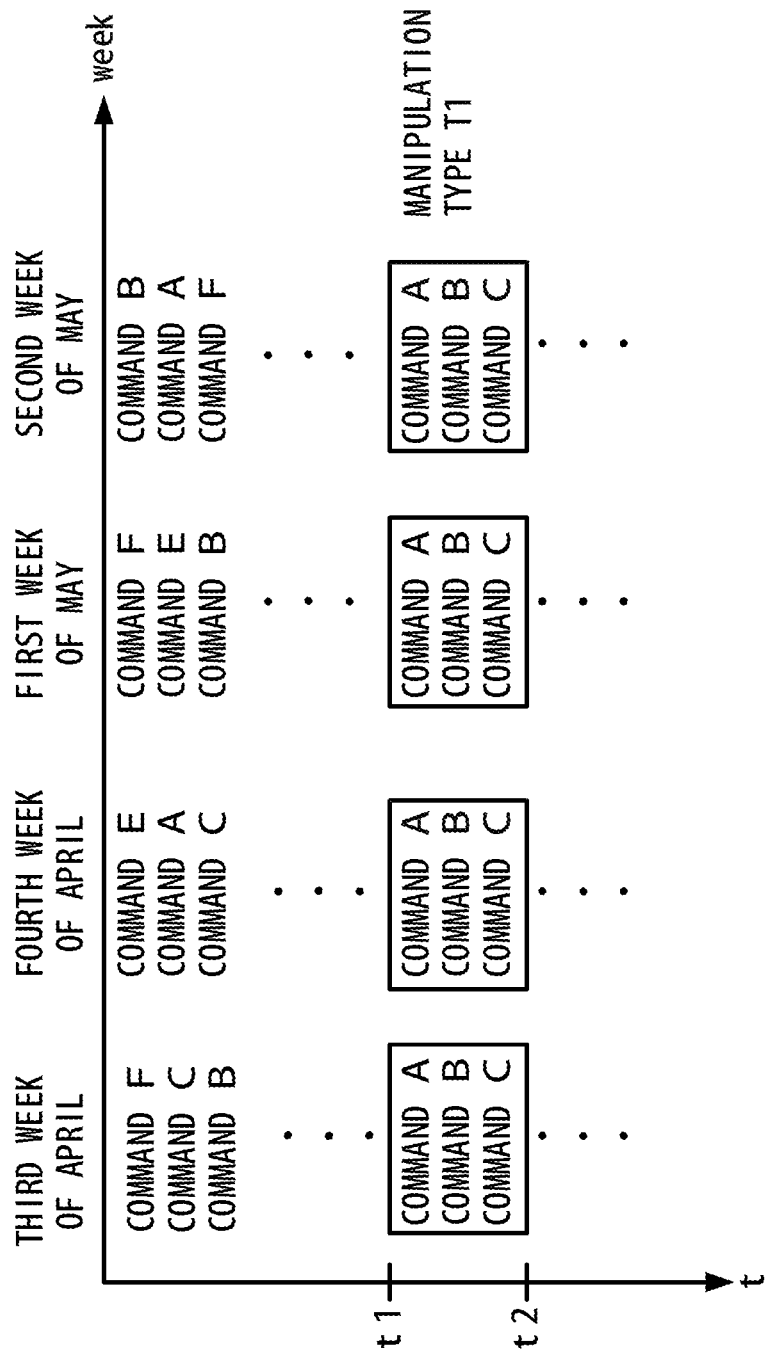
FIG. 3 illustrates an example of generation of a manipulation type.

FIG. 3 illustrates an example of generation of a manipulation type T1. In FIG. 3, the log items of log data stored in the log data database 18 are divided between weeks. The manipulation type processing unit 11 generates commands with a certain pattern in a predetermined time period (from time t1 to time t2) (commands A, B, and C) as a manipulation type T1.

Although not depicted in the example of FIG. 3, the manipulation type T1 also includes information on login and logout. In the example of FIG. 3, the manipulation type T1 indicates that manipulations have been performed in order of login→command A→command B→command C→logout.

The log deleting unit 14 deletes from the log data database 18 a log item that matches the manipulation type T1. This decreases the information amount of information stored in the log data database 18.

A change may be made to manipulation actions on the system to be performed by the business server 2. The manipulation type T1 is a manipulation type based on the log data before a change in the manipulation actions on the system. After a change has been made to the manipulation actions on the system, when the log deleting unit 14 deletes log items in the log data database 18 using the manipulation type T1, information for a post analysis may possibly be deleted.

Hence, after a change has been made to the manipulation actions on the system, it is inappropriate to use the manipulation type T1, i.e., the previously used manipulation type (a manipulation type that had been used until a change was made to the manipulation actions on the system).

Figure 4:
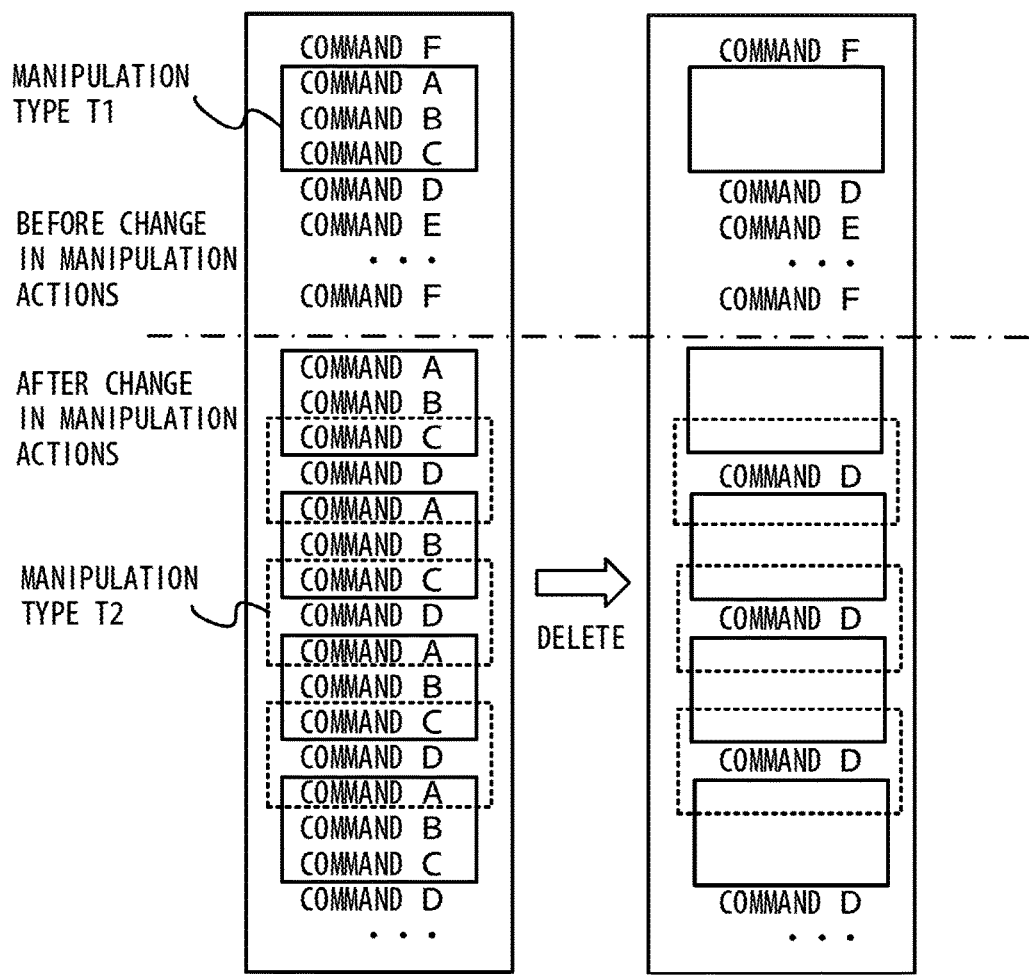
FIG. 4 illustrates an exemplary relationship between a manipulation type and a log item.

FIG. 4 illustrates an exemplary relationship between a manipulation type and deletion of a log item. In the example of FIG. 4, a manipulation type T1, which is a manipulation type before a change in manipulation actions, is a pattern of commands A, B, and C within a solid-line frame in FIG. 4.

A manipulation type T2, which is a manipulation type after a change in manipulation actions, is a pattern of commands C, D, and A within a dotted frame in FIG. 4. In the example of FIG. 4, an alternate long and short dash line indicates a timing at which a change is made to the manipulation actions on the system.

Accordingly, after a change has been made to the manipulation actions on the system, if the log deleting unit 14 deletes log items using the previous manipulation type T1, log items are deleted that are not to be deleted after the change has been made to the manipulation actions on the system. In the example of FIG. 4, after a change has been made to the manipulation actions on the system, the log items of, for example, the pattern of commands A, B, and C are not objects to be deleted.

However, after a change has been made to the manipulation actions on the system, if the log deleting unit 14 deletes log items using the previous manipulation type T1, the log items of the pattern of commands A, B, and C are also deleted. This deletes log items to be used for investigation of a cause of a trouble.

Accordingly, when the manipulation-action-change detecting unit 12 detects a change in manipulation actions on the business server 2, the manipulation type processing unit 11 updates a manipulation type. Using the updated (new) manipulation type, the log deleting unit 14 deletes log items of log data stored in the log data database 18.

<Example of Generation of New Operation Type>

Figure 5:
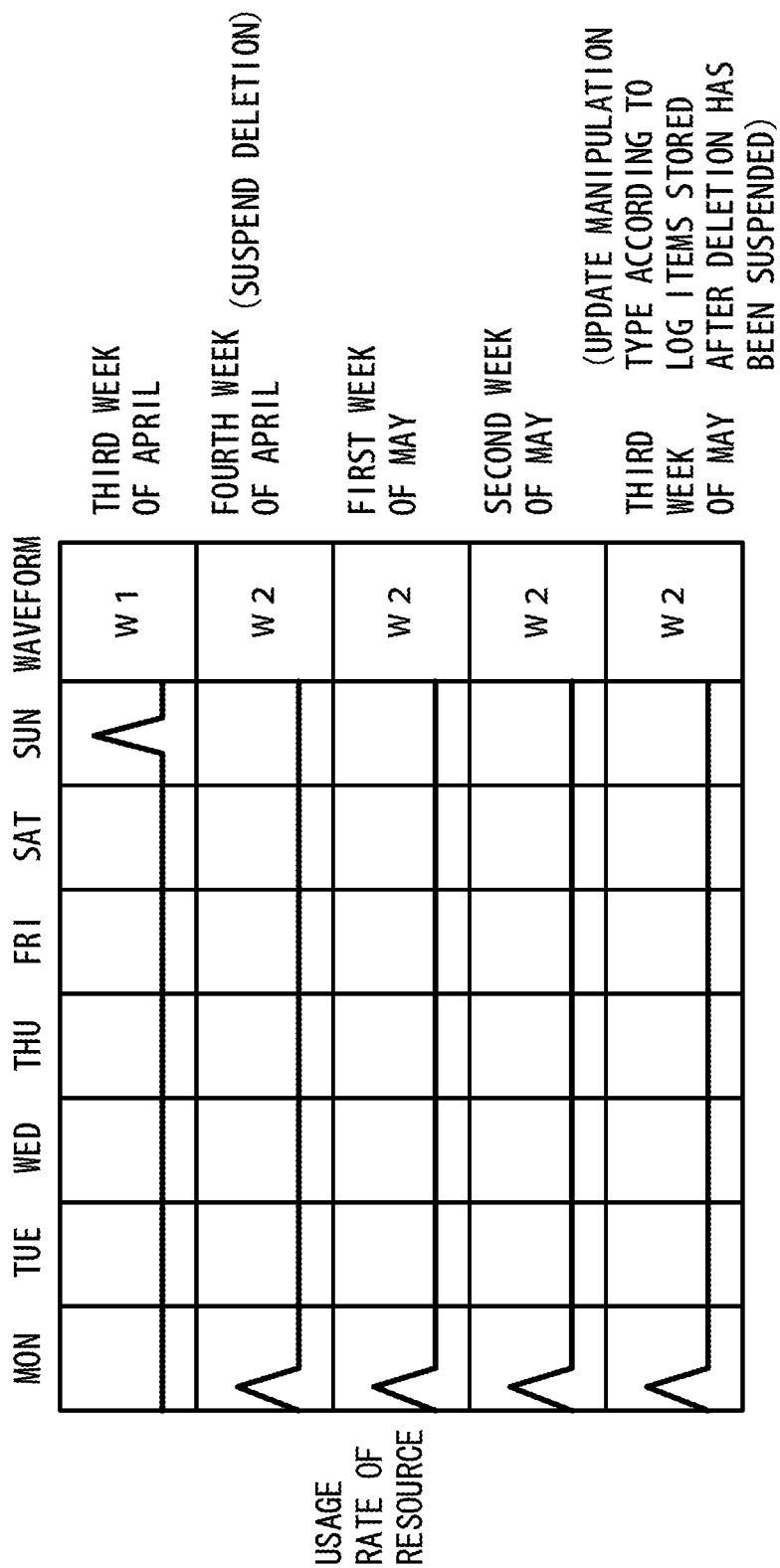
FIG. 5 illustrates exemplary resource waveforms (example 1)

FIG. 5 illustrates exemplary resource waveforms based on one execution environment of the business server 2 for a period from the third week of April to the third week of May. The resource waveforms are each a waveform representing a secular change in resource information. In the example of FIG. 5, the cycle of each resource waveform is one week.

For example, periodic maintenance may be concentrated on a predetermined period in a week. In this case, the usage rate of a resource is high during the predetermined period in the week. When a change has not been made to the manipulation actions on the system, the resource waveforms are estimated to be constant.

When a change has been made to the manipulation actions on the system, the periodic maintenance may possibly be performed in a different period. In this case, the period with a high usage rate of the resource before the change in the manipulation actions on the system is different from the period with a high usage rate of the resource after the change in the manipulation actions, and the resource waveforms are estimated to change.

In the waveforms depicted in FIG. 5, as of the third week of April, the usage rate of the resource is high in a predetermined time period on Sunday. The waveform as of the third week of April is referred to as a waveform W1. Meanwhile, in the waveforms depicted in FIG. 5, the usage rate of the resource is high in a predetermined time period on Monday of the fourth week of April and on the following Mondays. The waveform of the fourth week of April and after is hereinafter referred to as a waveform W2.

Accordingly, in accordance with the resource waveform (waveform indicating a change in information related to operations of a device), the manipulation-action-change detecting unit 12 detects a likelihood that a change was made to manipulation actions on the system performed by the business server 2 in the fourth week of April.

The resource waveform may temporarily change due to, for example, an accidental fault. In this case, there may be no change that has been made to the manipulation actions on the system performed by the business server 2.

After a change has been made to the resource waveform, when the changed waveform has lasted for a predetermined period, the manipulation-action-change detecting unit 12 detects that a change has been made to the manipulation actions on the system performed by the business server 2. In the example of FIG. 5, after a change has been made to the resource waveform, when the changed waveform has lasted for four weeks, the manipulation-action-change detecting unit 12 detects a change in manipulation actions.

FIG. 6 illustrates, per week, an exemplary correlation between a waveform, a manipulation type, and an operation of the management server 3. The business server 2 starts manipulation actions on the system in the first week of January. Just after the manipulation actions on the system has started, a small number of log items are stored in the log data database 18.

The manipulation type processing unit 11 generates a manipulation type according to a regularity of the log items stored in the log data database 18. Hence, while the log data database 18 stores a small number of log items, the number of samples for generating a manipulation type is small.

The manipulation type processing unit 11 does not generate a manipulation type until a certain number (predetermined number) of log items are stored in the log data database 18. In the example of FIG. 6, a manipulation type is not generated for the period from the first week of January to the first week of February. In the example of FIG. 6, the resource waveform for the period from the first week of January to the third week of April is W1.

In the example of FIG. 6, the manipulation type processing unit 11 generates an initial manipulation type T1 in the first week of February according to the regularity of the log items of log data stored in the log data database 18. In the first week of February and after, the log deleting unit 14 deletes log items that match a log pattern of the manipulation type T1 from the log items stored in the log data database 18.

In the example of FIG. 6, the resource waveform changes from W1 to W2 in the fourth week of April. According to the change in the resource waveform, the manipulation-action-change detecting unit 12 detects a likelihood of a change having been made to the manipulation actions on the system.

When the manipulation-action-change detecting unit 12 has detected the likelihood of a change having been made to the manipulation actions on the system, the deletion stopping unit 15 suspends the deletion of log items performed by the log deleting unit 14. Hence, after the deletion of log items has been suspended, manipulation logs collected by the information collecting unit 13 from an execution environment of the business server 2 are not deleted but are accumulated in the log data database 18.

When the changed resource waveform, i.e., the resource waveform W2, has lasted for a predetermined period (e.g., four weeks), the manipulation-action-change detecting unit 12 detects that a change has been made to the manipulation actions on the system. In this case, since it has been detected that a change has been made to the manipulation actions on the system, the deletion suitability determining unit 16 determines that the deletion of log items performed by the log deleting unit 14 using the previous manipulation type T1 is unsuitable.

The manipulation type processing unit 11 generates a new manipulation type T2 after a change is made to the manipulation actions on the system, and replaces the previous manipulation type T1 with the new manipulation type T2. The pattern of log items of the previous manipulation type T1 is different from that of the new manipulation type T2. The deletion stopping unit 15 cancels the suspending of the deletion of log items performed by the log deleting unit 14.

Accordingly, in the third week of May and after, the log deleting unit 14 deletes a pattern of log items matching the new manipulation type T2. According to the new manipulation type T2, the log deleting unit 14 deletes the log items that were stored in the log data database 18 during the period ranging from the moment at which the suspending of deletion of log items started to the moment at which the deletion of log items restarted.

Figure 7:
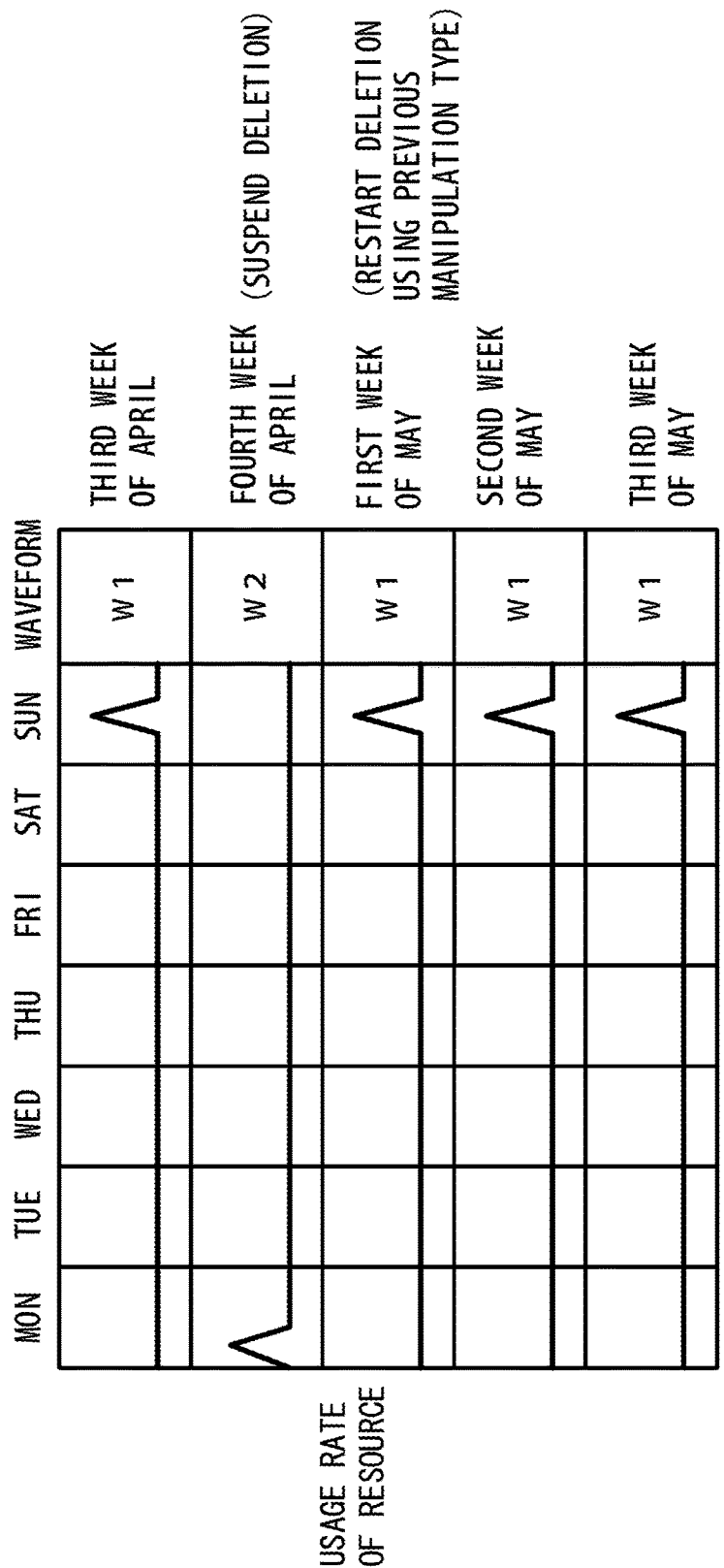
FIG. 7 illustrates exemplary resource waveforms (example 2)

FIG. 7 illustrates other examples of resource waveforms in one execution environment of the business server 2 for the period from the third week of April to the third week of May.

In FIG. 7, the resource waveform in the third week of April is W1, which changes to W2 in the fourth week of April.

In the fourth week of April, the manipulation-action-change detecting unit 12 detects the likelihood of a change having been made to the manipulation actions on the system performed by the business server 2. Accordingly, the deletion stopping unit 15 stops deletion of log items performed by the log deleting unit 14.

In the example of FIG. 7, the resource waveform changes from W2 back into W1 in the first week of May. In this situation, the resource waveform W2 after the change has not lasted for a predetermined period (e.g., four weeks). In this case, the manipulation-action-change detecting unit 12 detects that a change has not been made to the manipulation actions on the system.

When it has been detected that a change has not been made to the manipulation actions on the system, the deletion suitability determining unit 16 determines that the deletion of log items performed by the log deleting unit 14 using the previous manipulation type T1 is suitable. The deletion stopping unit 15 cancels the suspending of the deletion of log items performed by the log deleting unit 14.

The log deleting unit 14 deletes log items from the log data database 18 using the previous manipulation type T1. According to the manipulation type T1, the log deleting unit 14 also deletes the log items that were stored during the suspending of the deletion of log items.

Accordingly, when a change in the manipulation actions on the system has been detected according to a change situation of the resource waveform, the deletion suitability determining unit 16 determines that using the previous manipulation type T1 is unsuitable. In this case, the previous manipulation type T1 is not used, but the new manipulation type T2, i.e., the manipulation type after update, is used.

When a change in the manipulation actions on the system has not been detected according to the change situation of the resource waveform, the deletion suitability determining unit 16 determines that using the previous manipulation type T1 is suitable. In this case, the manipulation type is not updated, and the previous manipulation type T1 is used.

FIG. 8 illustrates an exemplary correlation per week between a waveform, a manipulation type, and an operation of the management server 3. In the first week of January, the business server 2 starts manipulation actions on the system. In the first week of February, the manipulation type processing unit 11 generates a manipulation type T1 according to a regularity of log items stored in the log data database 18. The log deleting unit 14 deletes log items from the log data database 18 according to the manipulation type T1.

When the manipulation-action-change detecting unit 12 detects, in the fourth week of April, a likelihood of a change having been made to the manipulation actions on the system, the deletion stopping unit 15 suspends deletion of log items performed by the log deleting unit 14. The resource waveform changes from W2 back into W1 in the first week of May, and hence the manipulation-action-change detecting unit 12 does not detect the change in the manipulation actions on the system.

In this case, the deletion suitability determining unit 16 determines that use of the previous manipulation type T1 is suitable, and hence the manipulation type processing unit 11 uses the previous manipulation type T1. In the first week of May and after, the log deleting unit 14 deletes log items from the log data database 18 using the previous manipulation type T1.

Figure 9:
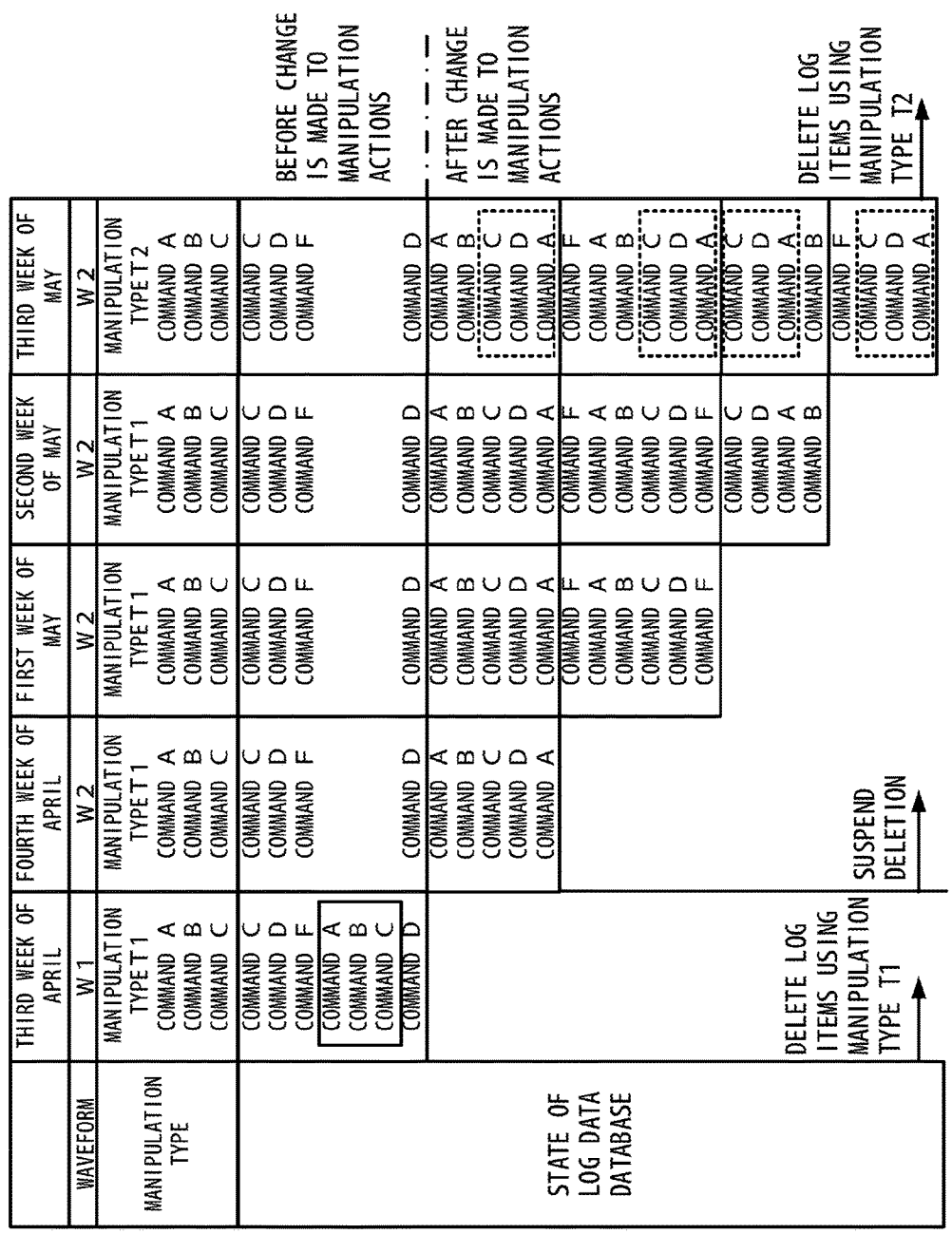
FIG. 9 illustrates an example of deletion of log items.

The following describes an example of deletion of log items with reference to FIG. 9. FIG. 9 depicts examples of waveforms and manipulation types for an execution environment for a user A of the business server 2, and examples of the state of the log data database 18.

FIG. 9 depicts the state of the log data database 18 for the period from the third week of April to the third week of May, but the log data database 18 also stores log data for the second week of April and before.

The information collecting unit 13 collects manipulation logs for the third week of April from the execution environment for the user A of the business server 2, and stores the collected manipulation logs in the log data database 18. For example, the information collecting unit 13 may collect the manipulation logs via an agent program directed to the execution environment for the user A.

In the example of FIG. 9, seven commands are executed in the third week of April. The information collecting unit 13 collects and stores manipulation logs in the log data database 18. The manipulation type in the third week of April is T1.

The log deleting unit 14 deletes from the log data database 18 log items with a pattern that matches the manipulation type T1. The log pattern of the manipulation type T1 is commands A, B, and C.

The log deleting unit 14 deletes log items of three commands indicated using a solid line in the example of FIG. 9. As a result, three commands from among the six commands stored in the log data database 18 in the third week of April other than the three enclosed by the solid line remain in the log data database 18.

The information collecting unit 13 also collects resource information for the third week of April from the execution environment for the user A of the business server 2, and stores the collected resource information in the resource information database 19. In the example of FIG. 9, the resource waveform based on the resource information for the third week of April is W1.

In the fourth week of April, the information collecting unit 13 collects resource information from the execution environment for the user A of the business server 2 and stores the collected resource information in the resource information database 19. According to resource information for the fourth week of April stored in the resource information database 19, the manipulation-action-change detecting unit 12 recognizes that the resource waveform has changed from W1 to W2.

In this case, the manipulation-action-change detecting unit 12 detects a likelihood of a change having been made to the manipulation actions on the system. When the manipulation-action-change detecting unit 12 detects a likelihood of a change having been made to the manipulation actions on the system, the deletion stopping unit 15 suspends deletion of log items performed by the log deleting unit 14.

In the fourth week of April, the information collecting unit 13 collects manipulation logs from the execution environment for the user A of the business server 2, and stores the collected manipulation logs in the log data database 18. In the example of FIG. 9, the information collecting unit 13 stores log items of five commands in the log data database 18.

In the fourth week of April, since the deletion of log items performed by the log deleting unit 14 has been suspended, the log items of the five commands stored in the log data database 18 are not deleted. This is also true for the first, second, and third weeks of May.

Accordingly, under a condition in which the log item of the initial command A in the fourth week of April is a start position, the manipulation logs collected by the information collecting unit 13 from the execution environment for the user A of the business server 2 in the first, second, and third weeks of May are not deleted but stored in the log data database 18.

According to the resource information stored in the resource information database 19, the manipulation-action-change detecting unit 12 recognizes that the resource waveform W2 has lasted for four weeks from the fourth week of April to the third week of May (a predetermined period). As a result, the manipulation-action-change detecting unit 12 detects that a change has been made to the manipulation actions on the system.

Since it has been detected that a change has been made to the manipulation actions on the system, the deletion suitability determining unit 16 determines that deleting log items using the previous manipulation type T1 is unsuitable. Accordingly, the manipulation type processing unit 11 updates the manipulation type to a new manipulation type T2.

Log items are not deleted during the period from the fourth week of April to the third week of May, i.e., a period during which deletion of log items is suspended. According to manipulation logs stored during this period in the log data database 18, the manipulation type processing unit 11 generates the new manipulation type T2.

That is, the manipulation type processing unit 11 generates the new manipulation type T2 according to the pattern of log items stored in the log data database 18 after deletion of log items has been suspended by the deletion stopping unit 15.

Let a certain log pattern for a predetermined time period per week be commands C, D, and A. The manipulation type processing unit 11 generates the log pattern enclosed by the broken line in FIG. 9 as the manipulation type T2, and updates the previous manipulation type T1 to the new manipulation type T2.

The log deleting unit 14 deletes log items matching the log pattern of the new manipulation type T2 from the log items that have been stored in the log data database 18 for the period from the fourth week of April to the third week of May. In the third week of May and after, the log deleting unit 14 deletes log items stored in the log data database 18 using the log pattern of the manipulation type T2, i.e., the updated manipulation type.

The following describes manipulation-action-change management information and log deletion management information with reference to the example of FIG. 10. The information collecting unit 13 collects resource information from the execution environments of the business server 2 and stores the collected resource information in the resource information database 19.

The log data database 18 stores resource information for each execution environment. According to resource information for each execution environment, the manipulation-action-change detecting unit 12 detects the situation of manipulation actions on the system for each execution environment.

Operational-action-change management information is managed by the manipulation-action-change detecting unit 12 and stored in, for example, the resource information database 19. A first column is a user ID. The user ID is the identifier of a user of an execution environment of the business server 2 and is also the identifier of the execution environment. ID is short for Identification.

For example, user ID "00001" means user A and also means the execution environment for user A. User ID "00002" means user B and also means the execution environment for user B.

A second column means an operation situation of the manipulation-action-change detecting unit 12. In the example of FIG. 10, the second column indicating a value of "0" indicates that the operation of the manipulation-action-change detecting unit 12 has been stopped. As described above, an initial manipulation type is not generated until a certain number of log items are stored in the log data database 18. The manipulation-action-change detecting unit 12 is not operated until the initial manipulation type is generated.

After the manipulation-action-change detecting unit 12 starts to be operated, in response to a change in a resource waveform, the manipulation-action-change detecting unit 12 detects a likelihood of a change having been made to the manipulation actions on the system. When a likelihood of a change having been made to the manipulation actions on the system is not detected, the manipulation-action-change detecting unit 12 sets the value of the second column to "1".

When a likelihood of a change having been made to the manipulation actions has been detected, the manipulation-action-change detecting unit 12 outputs a manipulation-action-change likelihood report to the log deleting unit 14. When the changed waveform has lasted for a predetermined period since the detection of the likelihood of a change having been made to the manipulation actions on the system, the manipulation-action-change detecting unit 12 detects the change in the manipulation actions on the system. In this case, the manipulation-action-change detecting unit 12 outputs a manipulation-action-change occurrence report to the log deleting unit 14.

When the changed waveform does not last for a predetermined period since the detection of the likelihood of a change having been made to the manipulation actions, the manipulation-action-change detecting unit 12 outputs, to the log deleting unit 14, a manipulation-action-change cancellation report to cancel the likelihood of a change having been made to the manipulation actions.

When neither a manipulation-action-change occurrence report nor a manipulation-action-change cancellation report is output to the log deleting unit 14 after a manipulation-action-change likelihood report is output to the log deleting unit 14, the manipulation-action-change detecting unit 12 sets the value of the second column to "2".

When a manipulation-action-change occurrence report has been output to the log deleting unit 14, the manipulation-action-change detecting unit 12 sets the value of the second column to "3". When a manipulation-action-change cancellation report has been output to the log deleting unit 14, the manipulation-action-change detecting unit 12 sets the value of the second column to "4".

The following describes log deletion management information. Log deletion management information is managed by the log deleting unit 14 and stored in, for example, the log data database 18. A first column indicates a user ID.

A second column means an operation situation of the log deleting unit 14. The second column indicating a value of "0" indicates that the operation of the log deleting unit 14 has been stopped. When the second column of manipulation-action-change management information is "0", the second column of the corresponding log deletion management information is also "0".

When the log deleting unit 14 has not received a manipulation-action-change likelihood report from the manipulation-action-change detecting unit 12 since generation of an initial manipulation type, the log deleting unit 14 sets the value of the second column to "1". When the log deleting unit 14 has received a manipulation-action-change likelihood report from the manipulation-action-change detecting unit 12, the log deleting unit 14 sets the value of the second column to "2".

When the log deleting unit 14 has received a manipulation-action-change occurrence report from the manipulation-action-change detecting unit 12, the log deleting unit 14 sets the value of the second column to "3". When the log deleting unit 14 has received a manipulation-action-change cancellation report from the manipulation-action-change detecting unit 12, the log deleting unit 14 sets the value of the second column to "4".

Operational-action-change management information is managed by the manipulation-action-change detecting unit 12. The manipulation-action-change detecting unit 12 changes manipulation-action-change management information in accordance with the situation. The manipulation-action-change detecting unit 12 may make various types of determinations according to manipulation-action-change management information.

Log deletion management information is managed by the log deleting unit 14. The log deleting unit 14 changes log deletion management information in accordance with the situation. The log deleting unit 14 may make various types of determinations according to log deletion management information.

<Flowchart Illustrating Exemplary Processing Flow in Accordance with the Embodiment>

Figure 11:
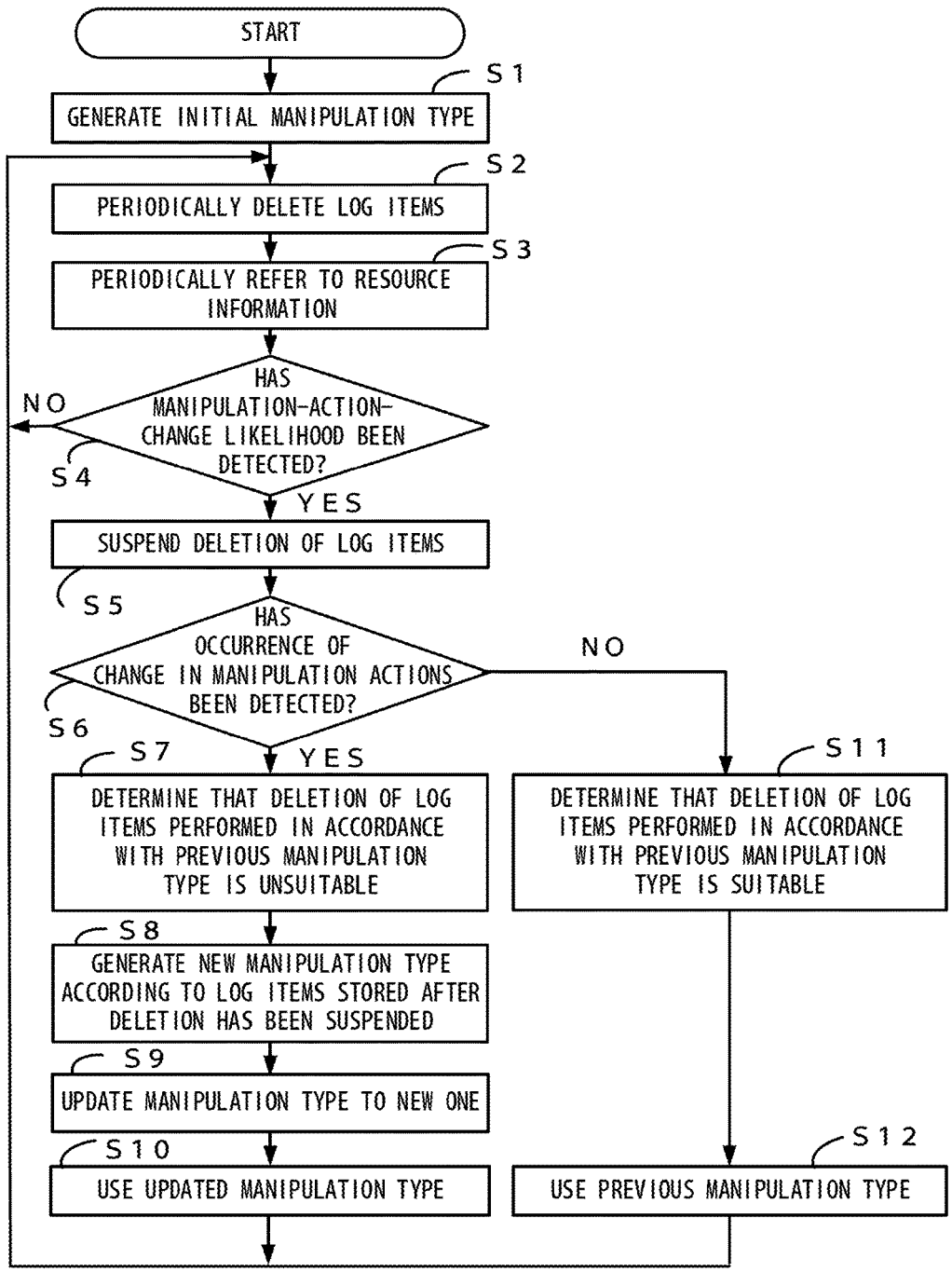
FIG. 11 is a flowchart illustrating an exemplary process in accordance with an embodiment.

With reference to the flowchart of FIG. 11, the following describes an exemplary processing flow in accordance with the embodiment. After the business server 2 starts manipulation actions on the system, the information collecting unit 13 collects manipulation logs from execution environments of the business server 2 and stores the collected manipulation logs in the log data database 18.

The manipulation type processing unit 11 does not generate a manipulation type until a certain number of log items are stored in the log data database 18. The operations of the manipulation-action-change detecting unit 12 and the log deleting unit 14 have been stopped.

In this case, the values of the respective second columns of manipulation-action-change management information and log deletion management information are set to "0". When a certain number of log items have been stored in the log data database 18, the manipulation type processing unit 11 generates an initial manipulation type according to the regularity of the log items of log data stored in the log data database 18 (step S1). Following step S1, the values of the respective second columns of manipulation-action-change management information and log deletion management information are changed to "1".

For example, the manipulation type processing unit 11 may generate, as an initial manipulation type, a log pattern for a predetermined time period from among the log items stored in the log data database 18.

Using the manipulation type, the log deleting unit 14 deletes from the log data database 18 log items with a pattern matching the manipulation type (step S2). The used manipulation type may be the initial manipulation type or may be a manipulation type newly generated by the manipulation type processing unit 11.

The information collecting unit 13 collects resource information from execution environments of the business server 2 and stores the collected resource information in the resource information database 19. The manipulation-action-change detecting unit 12 periodically refers to the resource information database 19 (step S3).

The manipulation-action-change detecting unit 12 determines whether a manipulation-action-change likelihood has been detected (step S4). The manipulation-action-change detecting unit 12 recognizes a resource waveform based on resource information stored in the resource information database 19.

When a change in the resource waveform has been recognized, the manipulation-action-change detecting unit 12 detects a likelihood that a change has been made to the manipulation actions on the system. When a change in the resource waveform has not been recognized, the manipulation-action-change detecting unit 12 does not detect a likelihood that a change has been made to the manipulation actions on the system.

When the manipulation-action-change detecting unit 12 does not detect a likelihood of a change having been made to the manipulation actions on the system (NO in step S4), the process returns to step S2.

When the manipulation-action-change detecting unit 12 has detected a likelihood of a change having been made to the manipulation actions on the system (YES in step S4), the deletion stopping unit 15 suspends deletion of log items performed by the log deleting unit 14 (step S5).

After a change is made to the resource waveform, the manipulation-action-change detecting unit 12 performs monitoring as to whether the changed waveform has lasted for a predetermined period. When the changed resource waveform has lasted for a predetermined period, the manipulation-action-change detecting unit 12 detects that a change has been made to the manipulation actions on the system.

When the manipulation-action-change detecting unit 12 has detected an occurrence of a change in the manipulation actions on the system (YES in step S6), the deletion suitability determining unit 16 determines that deletion of log items performed in accordance with the previously used manipulation type is unsuitable (step S7).

After the deletion of log items is suspended in step S5, the manipulation type processing unit 11 generates a new manipulation type according to the regularity of log items of log data stored in the log data database 18 (step S8). The manipulation type processing unit 11 replaces the previous manipulation type with the new manipulation type (step S9).

The deletion stopping unit 15 restarts the deletion of log items performed by the log deleting unit 14. The log deleting unit 14 uses the updated manipulation type, i.e., the new manipulation type (step S10). Then, the process returns to step S2, and the log deleting unit 14 deletes log items stored in the log data database 18 using the new manipulation type.

When the manipulation-action-change detecting unit 12 does not detect an occurrence of a change in the manipulation actions on the system (NO in step S6), the deletion suitability determining unit 16 determines that the deletion of log items performed in accordance with the previously used manipulation type is suitable (step S11).

In this case, after the deletion of log items performed by the log deleting unit 14 is restarted, the manipulation type processing unit 11 uses the previously used manipulation type (step S12). Then, the process returns to step S2, and the log deleting unit 14 deletes log items stored in the log data database 18 using the previous manipulation type.

Figure 12:
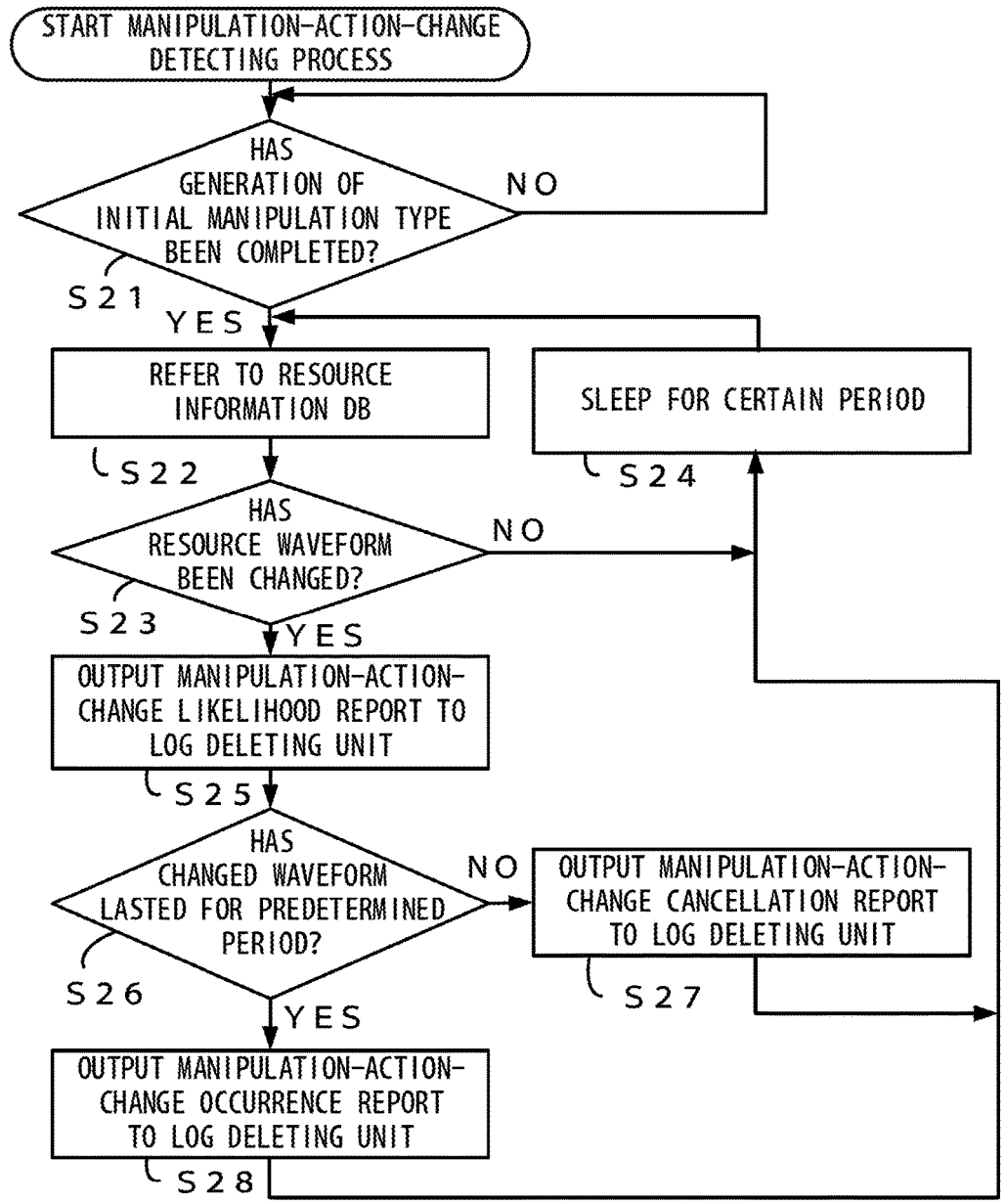
FIG. 12 is a flowchart illustrating an exemplary manipulation-action-change detecting process.

With reference to the flowchart of FIG. 12, the following describes an example of a process performed by the manipulation-action-change detecting unit 12 (hereinafter referred to as a manipulation-action detecting process). When generation of an initial manipulation type has been completed, the manipulation type processing unit 11 outputs a report to that effect to the manipulation-action-change detecting unit 12.

When the manipulation-action-change detecting unit 12 does not receive a report indicating that generation of an initial manipulation type has been completed (NO in step S21), the process does not shift to the following step. In this case, the manipulation-action-change detecting unit 12 does not refer to the resource information database 19.

When the manipulation-action-change detecting unit 12 has received a report indicating that generation of an initial manipulation type has been completed (YES in step S21), the manipulation-action-change detecting unit 12 refers to the resource information database 19 (step S22). According to resource information stored in the resource information database 19, the manipulation-action-change detecting unit 12 determines whether a change has been made to a resource waveform (step S23).

When it is not determined that a change has been made to the resource waveform (NO in step S23), the manipulation-action-change detecting unit 12 sleeps for a certain period (e.g., one week) (step S24).

When it is determined that a change has been made to the resource waveform (YES in step S23), the manipulation-action-change detecting unit 12 outputs a manipulation-action-change likelihood report to the log deleting unit 14 (step S25). In this case, the value of the second column of manipulation-action-change management information is changed to "2".

According to resource information stored in the resource information database 19, the manipulation-action-change detecting unit 12 determines whether the resource waveform after the change in the waveform has lasted for a predetermined period (step S26).

When it is determined that the resource waveform after the change has not lasted for a predetermined period (NO in step S26), the manipulation-action-change detecting unit 12 outputs a manipulation-action-change cancellation report to the log deleting unit 14 (step S27). In this case, the value of the second column of manipulation-action-change management information is changed to "4".

When it is determined that the resource waveform after the change has lasted for a predetermined period (YES in step S26), the manipulation-action-change detecting unit 12 outputs a manipulation-action-change occurrence report to the log deleting unit 14 (step S28). In this case, the value of the second column of manipulation-action-change management information is changed to "3".

Figure 13:
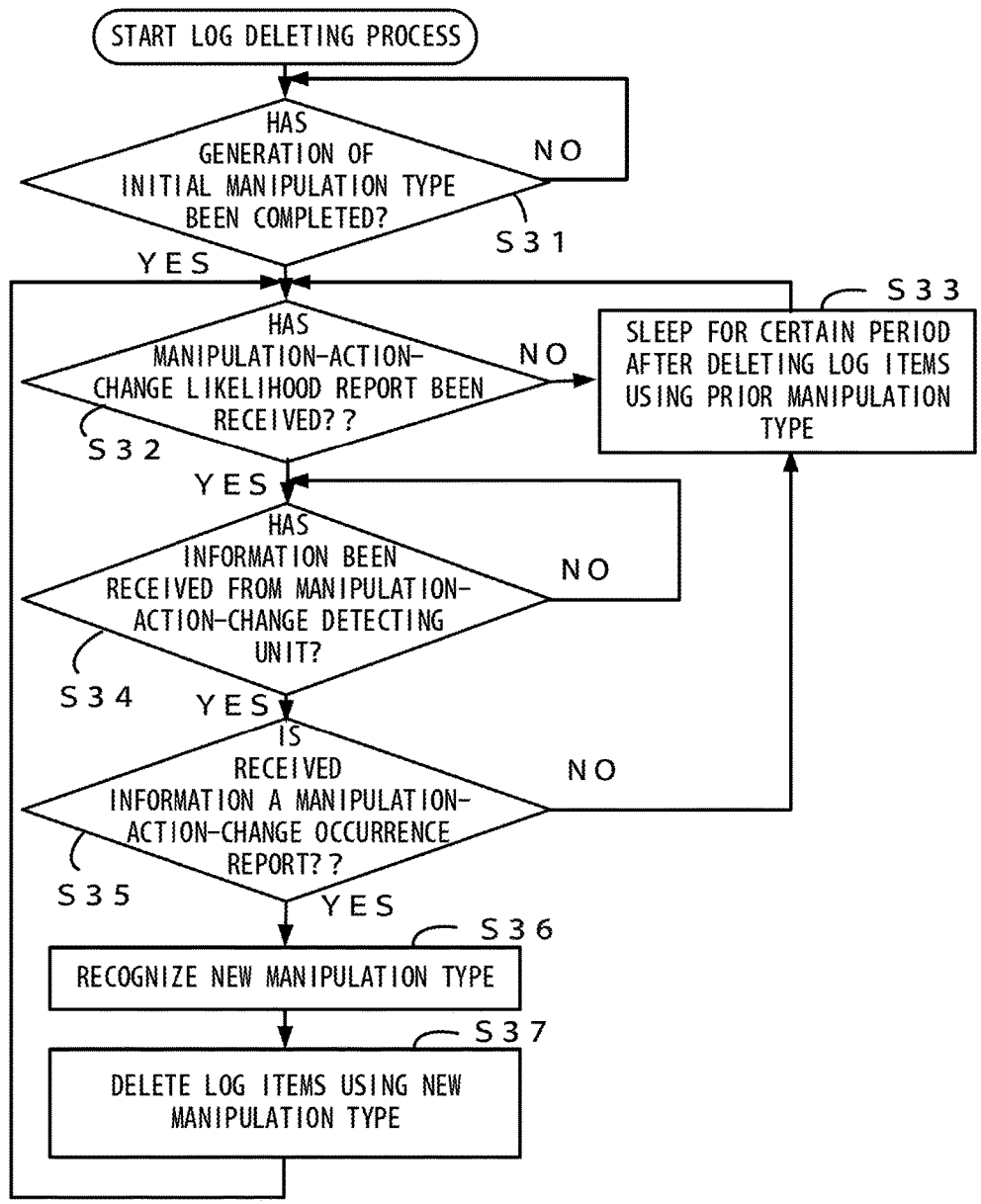
FIG. 13 is a flowchart illustrating an exemplary log deleting process.

The following describes an example of a process performed by the log deleting unit 14 (hereinafter referred to as a log deleting process) by referring to the flowchart of FIG. 13. When the log deleting unit 14 does not receive from the manipulation type processing unit 11 a report that generation of an initial manipulation type has been completed (NO in step S31), the process does not shift to a next step.

When the log deleting unit 14 has received from the manipulation type processing unit 11 a report that generation of an initial manipulation type has been completed (YES in step S31), the log deleting unit 14 determines whether a manipulation-action-change likelihood report has been received (step S32).

When the log deleting unit 14 does not receive a manipulation-action-change likelihood report (NO in step S32), the log deleting unit 14 sleeps for a certain period after deleting log items of the log data database 18 using a prior manipulation type (step S33).

When the log deleting unit 14 has received a manipulation-action-change likelihood report (YES in step S32), the log deleting unit 14 determines whether information has been received from the manipulation-action-change detecting unit 12 (step S34). When the log deleting unit 14 has received a manipulation-action-change likelihood report, the value of the second column of log deletion management information is changed to "2".

When the log deleting unit 14 does not receive information from the manipulation-action-change detecting unit 12 (NO in step S34), the process does not shift to a next step.

When the log deleting unit 14 has received information from the manipulation-action-change detecting unit 12 (YES in step S34), the manipulation-action-change detecting unit 12 determines whether the received information is a manipulation-action-change occurrence report (step S35).

Unless the received information is a manipulation-action-change occurrence report, the received information is a manipulation-action-change cancellation report. In this case (NO in step S35), the manipulation type is not updated, and hence the process shifts to step S33.

When the received information is a manipulation-action-change occurrence report (YES in step S35), the log deleting unit 14 recognizes a new manipulation type updated by the manipulation type processing unit 11 (step S36).

Using the new manipulation type, the log deleting unit 14 deletes log items matching the log pattern of the new manipulation type from among the log items stored in the log data database 18 after deletion of log items has been suspended (step S37).

When the log deleting unit 14 has received a manipulation-action-change occurrence report from the manipulation-action-change detecting unit 12, the value of the second column of log deletion management information is changed to "3". When the log deleting unit 14 has received a manipulation-action-change cancellation report from the manipulation-action-change detecting unit 12, the value of the second column of log deletion management information is changed to "4".

The following describes a process performed by the monitoring significance setting unit 17 (hereinafter referred to as a monitoring significance determining process). The monitoring significance setting unit 17 sets a monitoring significance for each execution environment of the business server 2. To set the monitoring significance, the monitoring significance setting unit 17 refers to the log data database 18.

Log items matching the log pattern of a manipulation type are deleted from among the log items stored in the log data database 18. As described above, the manipulation type is a pattern that log items based on a regularity of commands executed in periodic maintenance have.

The log data database 18 stores log data for each execution environment of the business server 2. The monitoring significance setting unit 17 determines a monitoring significance for each execution environment in accordance with the number of logins stored in the log data database 18.

For example, a high frequency of execution of commands to investigate a cause of a trouble may lead to a large amount of information on logins remaining in the log data database 18. Meanwhile, a low frequency of execution of commands to investigate a cause of a trouble may lead to a small amount of information on logins remaining in the log data database 18.

An execution environment with many logins stored in the log data database 18 involves a high frequency of execution of commands to investigate a cause of a trouble, and accordingly the monitoring significance setting unit 17 sets a high monitoring significance for such an execution environment.

Meanwhile, an execution environment with few logins stored in the log data database 18 involves a low frequency of execution of commands to investigate a cause of a trouble, and accordingly the monitoring significance setting unit 17 sets a low monitoring significance for such an execution environment.

<Exemplary Hardware Configuration of Management Server>

Figure 14:
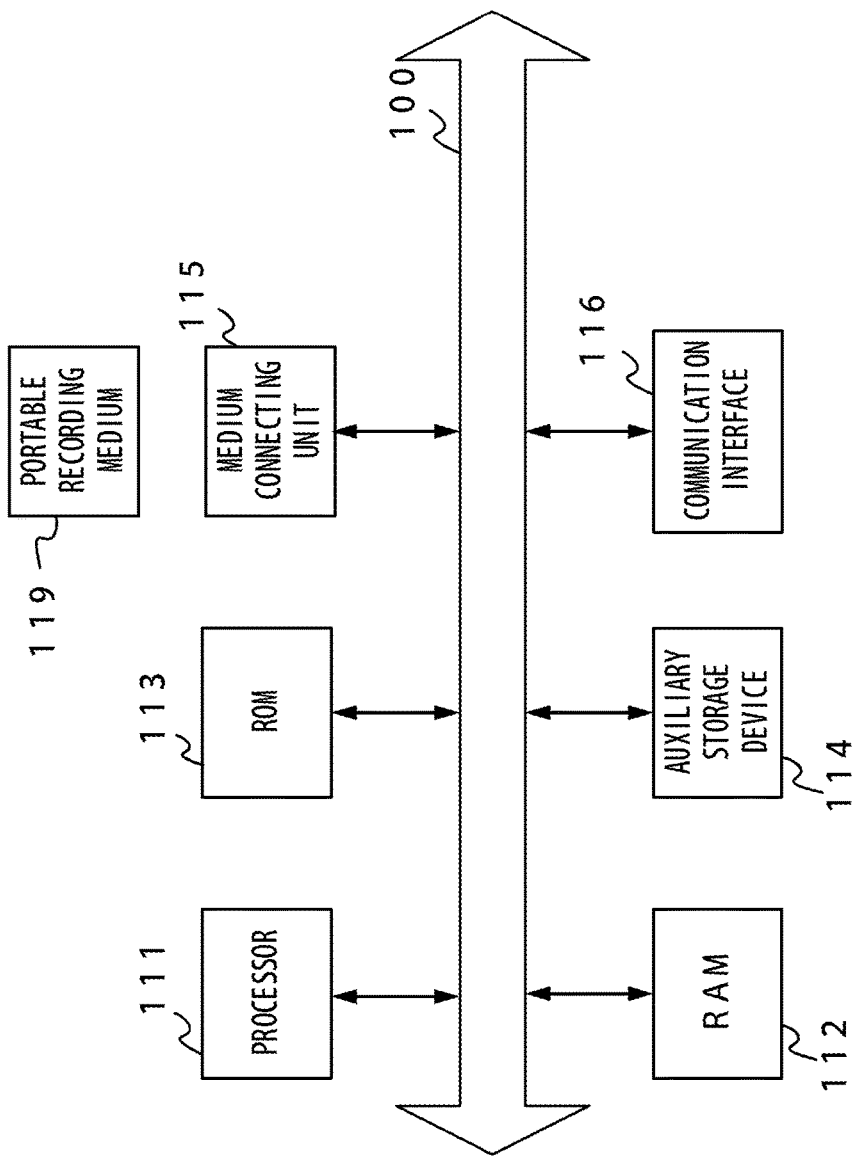
FIG. 14 illustrates an exemplary hardware configuration of a management server.

The following describes an exemplary hardware configuration of the management server 3 by referring to the example of FIG. 14. As described above, the management server 3 is an example of the log management apparatus.

As illustrated in the example of FIG. 14, a processor 111, a Random Access Memory (RAM) 112, a Read Only Memory (ROM) 113, an auxiliary storage device 114, a medium connecting unit 115, and a communication interface 116 are connected to a bus 100.

The processor 111 is an arbitrary processing circuit. For example, the CPU described above may be applied to the processor 111.

The processor 111 executes programs loaded into the RAM 112. The executed programs may include a log management program for performing a process in accordance with the embodiment. The ROM 113 is a nonvolatile storage device that stores a program to be loaded into the RAM 112.

The auxiliary storage device 114 stores various pieces of information. For example, the auxiliary storage device 114 may include a hard disk drive or a semiconductor memory. The medium connecting unit 115 is connectable to a portable recording medium 119.

The portable recording medium 119 may be a portable memory or optical disk (e.g., Compact Disk (CD) or Digital Versatile Disk (DVD)). The portable recording medium 119 may record a log management program for performing a process in accordance with the embodiment.

The processor 111 may execute the log management program so as to achieve the following elements of the management server 3: the manipulation type processing unit 11, the manipulation-action-change detecting unit 12, the information collecting unit 13, the log deleting unit 14, the deletion stopping unit 15, the deletion suitability determining unit 16, and the monitoring significance setting unit 17. The log data database 18 and the resource information database 19 may be achieved by the RAM 112 or the auxiliary storage device 114.

All of the RAM 112, the ROM 113, the auxiliary storage device 114, and the portable recording medium 119 are examples of computer-readable tangible storage media. These tangible storage media are not transitory media such as signal carrier waves.

<Other Items>

In accordance with the embodiment, information on logs can be suitably deleted when a change is made to the operation situation of a device under management.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recoding medium having stored therein a log management program that causes a processor to execute a process comprising:
    suspending, in accordance with a change in information related to an operation of a device under management, deletion of log items of log data of the device performed in accordance with log pattern identification information generated according to a regularity of the log items of the log data;
    determining, according to a change situation of the information related to the operation, suitability of the deletion of the log items performed in accordance with the log pattern identification information; and
    updating, when the deletion is determined to be unsuitable, the log pattern identification information according to a log item stored after the deletion has been suspended.

2. The recording medium according to claim 1, the process further comprising:
    generating new log pattern identification information that is different from the log pattern identification information when the deletion of the log items performed in accordance with the log pattern identification information is determined to be unsuitable according to a change situation of information related to an operation of the device performed while the deletion is suspended.

3. The recording medium according to claim 1, the process further comprising:
    using the log pattern identification information when the deletion of the log items performed in accordance with the log pattern identification information is determined to be suitable according to a change situation of information related to an operation of the device performed while the deletion is suspended.

4. The recording medium according to claim 1, the process further comprising:
    after the deletion has been suspended
        updating the log pattern identification information when a state after the change in the information related to the operation of the device has lasted for a predetermined period, and
        using the log pattern identification information when the state after the change does not last for the predetermined period.

5. The recording medium according to claim 1, the process further comprising:
    detecting that a change has been made to the information related to the operation of the device when detecting that a change has been made to a waveform that is based on information indicating a status of use of a resource of the device per predetermined time.

6. A log management method conducted by a processor, the log management method comprising:
    suspending, in accordance with a change in information related to an operation of a device under management, deletion of log items of log data of the device performed in accordance with log pattern identification information generated according to a regularity of the log items of the log data;
    determining, according to a change situation of the information related to the operation, suitability of the deletion of the log items performed in accordance with the log pattern identification information; and updating, when the deletion is determined to be unsuitable, the log pattern identification information according to a log item stored after the deletion has been suspended.

7. A log management apparatus comprising:

a processor configured to execute a process including:

suspending, in accordance with a change in information related to an operation of a device under management, deletion of log items of log data of the device performed in accordance with log pattern identification information generated according to a regularity of the log items of the log data;

determining, according to a change situation of the information related to the operation, suitability of the deletion of the log items performed in accordance with the log pattern identification information; and updating, when the deletion is determined to be unsuitable, the log pattern identification information according to a log item stored after the deletion has been suspended.

\* \* \* \* \*